(12) United States Patent
Tachikawa (10) Patent No.: US 7,663,665 B2
(45) Date of Patent: Feb. 16, 2010

(54) COMMUNICATION DEVICE AND METHOD FOR TRANSFERRING VIDEO-STREAM DATA TO A DISPLAY DEVICE AND A STORAGE DEVICE

(75) Inventor: Hirohide Tachikawa, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 401 days.

(21) Appl. No.: 11/739,554

(22) Filed: Apr. 24, 2007

(65) Prior Publication Data
US 2007/0261091 A1 Nov. 8, 2007

(30) Foreign Application Priority Data
May 2, 2006 (JP) ............... 2006-128477

(51) Int. Cl.
  *H04N 5/225* (2006.01)
  *H04N 5/222* (2006.01)
(52) U.S. Cl. .................. 348/207.1; 348/333.01
(58) Field of Classification Search ............ 348/207.99, 348/207.1, 231.2, 333.01, 333.11; 725/105; 711/100, 154, 163
See application file for complete search history.

(56) References Cited

U.S. PATENT DOCUMENTS

| | | | | |
|---|---|---|---|---|
| 6,701,058 | B1 * | 3/2004 | Tsubaki .................. | 386/46 |
| 7,319,698 | B2 * | 1/2008 | Higashigawa et al. ....... | 370/394 |
| 2003/0011680 | A1 * | 1/2003 | Tanaka et al. ............ | 348/207.1 |
| 2004/0013121 | A1 * | 1/2004 | Higashigawa et al. ....... | 370/400 |

FOREIGN PATENT DOCUMENTS

JP     10-070523 A     3/1998

* cited by examiner

*Primary Examiner*—Jason Chan
*Assistant Examiner*—Nicholas G Giles
(74) *Attorney, Agent, or Firm*—Canon USA, Inc. IP Division

(57) ABSTRACT

An apparatus configured to transfer video-stream data to each of a display device and a storage device with low delay and stability is provided. The apparatus stores video-stream data that is transferred to the storage device without success in a memory when the display device is in the on state, and resends the video-stream data that is transferred to the storage device without success and that is stored in the memory to the storage device when the display device is in the off state.

14 Claims, 10 Drawing Sheets

FIG. 3

| MAC ADDRESS | IP ADDRESS | TYPE | FORMAT | STATUS |
|---|---|---|---|---|
| 00:20:52:32:65:24 | 192.168.0.10 | CAMERA | 1080p | ACTIVE |
| 00:35:62:45:1e:32 | 192.168.0.100 | STORAGE | 1080p | ACTIVE |
| 00:24:20:36:ae:30 | 192.168.0.25 | DISPLAY | 1080i | ACTIVE |

| MAC ADDRESS | IP ADDRESS | TYPE | FORMAT | STATUS |
|---|---|---|---|---|
| 00:20:52:32:65:24 | 192.168.0.10 | CAMERA | 1080p | ACTIVE |
| 00:35:62:45:1e:32 | 192.168.0.100 | STORAGE | 1080p | ACTIVE |
| 00:24:20:36:ae:30 | 192.168.0.25 | DISPLAY | 1080i | NON-ACTIVE |
| 00:65:32:15:52:33 | 192.168.0.15 | RC | x | ACTIVE |

FIG. 12

COMMUNICATION DEVICE AND METHOD FOR TRANSFERRING VIDEO-STREAM DATA TO A DISPLAY DEVICE AND A STORAGE DEVICE

BACKGROUND OF THE INVENTION

1. Field of the Invention

The present invention generally relates to an image-pickup device, a communication device, and a communication method, and more particularly relates to a video-stream data transfer method and an apparatus capable of transferring video-stream data.

2. Description of the Related Art

Various systems are available to distribute video information transmitted from a video server and/or a network camera to a user through a network in real time. If an error occurs in a communication path or the like while the user is viewing the video on a display unit, or recording the video information in a storage device, the video information may be resent to the user. One such system is disclosed in Japanese Patent Laid-Open No. 10-70523, for example.

However, when the above-described system resends massive stream data including data on a high-quality image or the like, so as to distribute the stream data to the user, the real-time property of the system is reduced and a delay in the video distribution is increased.

SUMMARY OF THE INVENTION

An embodiment of the present invention allows for distributing stream data with a reduced delay and storing the stream data with stability.

According to an embodiment of the present invention, an apparatus capable of transferring video-stream data is provided. The apparatus includes a communication unit configured to transfer video-stream data to each of a display device and a storage device, a memory configured to store the video-stream data transferred to the storage device, and a controller that is configured to store the video-stream data which is transferred from the communication unit to the storage device without success in the memory when the display device is in an on state and that is configured to resend the video-stream data which is transferred from the communication unit to the storage device without success and which is stored in the memory to the storage device when the display device is in an off state.

Further features of the present invention will become apparent from the following description of exemplary embodiments with reference to the attached drawings.

DESCRIPTION OF THE EMBODIMENTS

Hereinafter, embodiments of the present invention will be described with reference to the attached drawings.

First Embodiment

Figure 1:
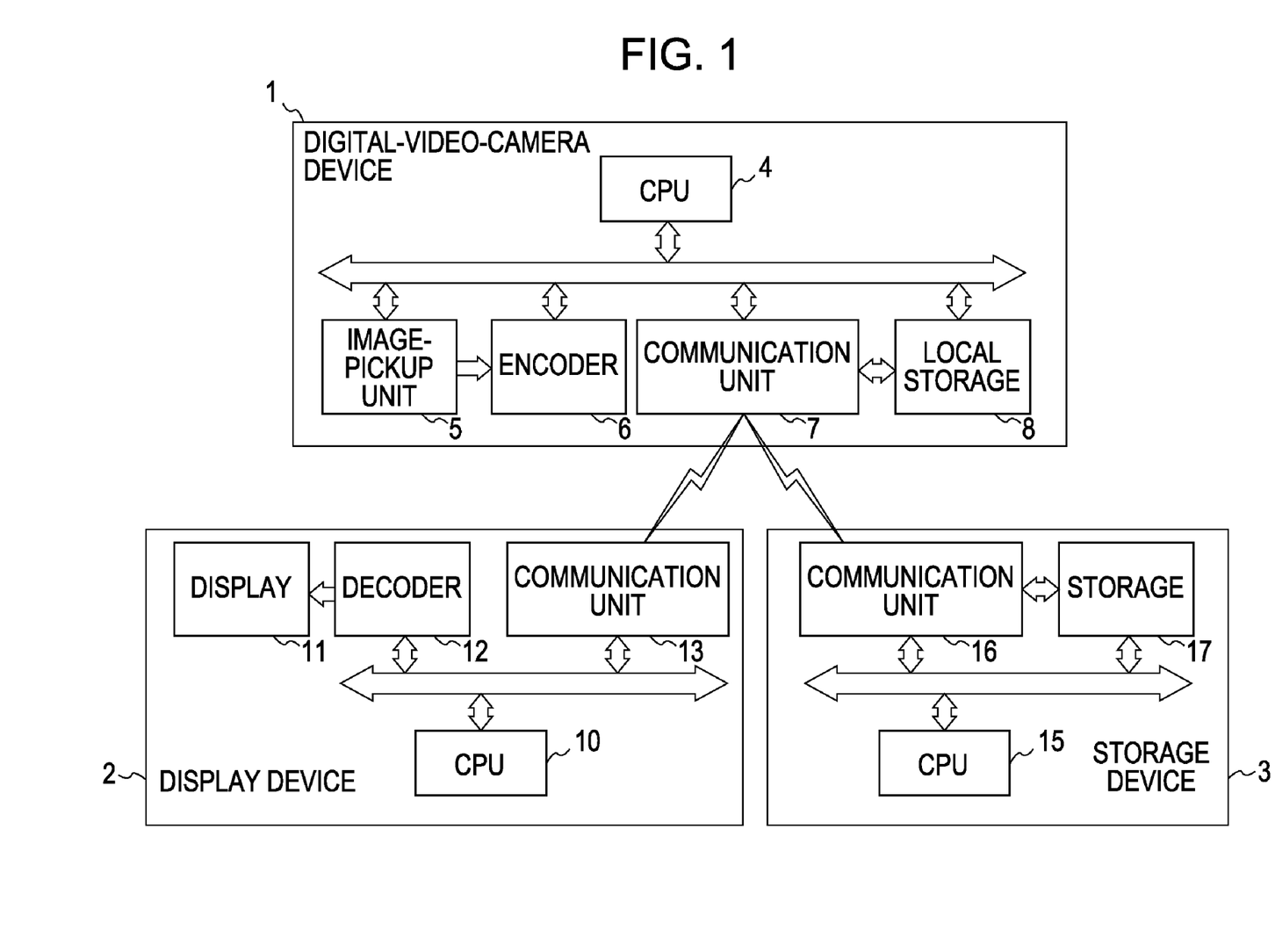
FIG. 1 shows the hardware configuration of example devices included in a system according to an embodiment of the present invention.

FIG. 1 shows the hardware configuration of each of example devices included in a system according to a first embodiment of the present invention. A digital-video-camera device (video-transfer device) 1 externally transmits picked-up video to a network. A display device 2 decodes and shows video-stream data transferred via the network. A storage device 3 accumulates and stores the video-stream data transferred via the network. Here, the term "video-stream data" used in embodiments of the present invention denotes data provided so that the display device 2 shows video on a display unit and the storage device 3 stores the data in parallel with the reception of the video data transferred via the network.

A central-processing unit (CPU) 4 is a controller (processing unit) that controls the digital-video-camera device 1. The CPU 4 executes a program stored in local storage 8 or the like, for example, so as to offer functions of the digital-video-camera device 1 that will be described later and/or execute processing procedures illustrated in a flowchart or the like that will be described later.

An image-pickup unit 5 includes an image-pickup element, an analog-to-digital (A/D) converter, and so forth, and captures and transmits data on an image to the digital-video-camera device 1. An encoder 6 is a circuit configured to encode data on the image picked up by the image-pickup unit 5 into video-stream data whose format is MPEG or the H.264 standard, for example. A communication unit 7 includes a circuit provided, so as to perform communications between the digital-video-camera device 1 and an external device. The local storage 8 is a relatively low-capacity storage unit such as a flash memory provided in the digital-video-camera device 1.

A CPU 10 is a controller (processing unit) having centralized control over the entire display device 2. The CPU 10 offers functions of the display device 2 that will be described later by executing a program stored in a memory or the like (not shown) of the display device 2, for example.

A display unit 11 is a liquid-crystal device provided, so as to produce a display image for the display device 2. A decoder 12 is a circuit provided, so as to decode the video-stream data transferred via the network into video information. A communication unit 13 is provided in the display device 2 and includes a circuit provided, so as to perform communication processing.

A CPU 15 is a controller (processing unit) having centralized control over the entire storage device 3. The CPU 15 offers functions of the storage device 3 that will be described later by executing a program stored in large-capacity storage 17 or the like, for example.

A communication unit 16 is provided in the storage device 3 and includes a circuit provided, so as to perform communication processing. The large-capacity storage 17 is a record device such as a hard disk drive (HDD).

Here, the digital-video-camera device 1 transmits video-stream data relating to picked-up video to each of the display device 2 and the storage device 3 through unicast communications. Upon receiving the video-stream data, the display device 2 shows the video corresponding to the video-stream data on the display unit 11 in real time. Further, the storage device 3 accumulates the video-stream data onto the storage unit 17.

Figure 2:
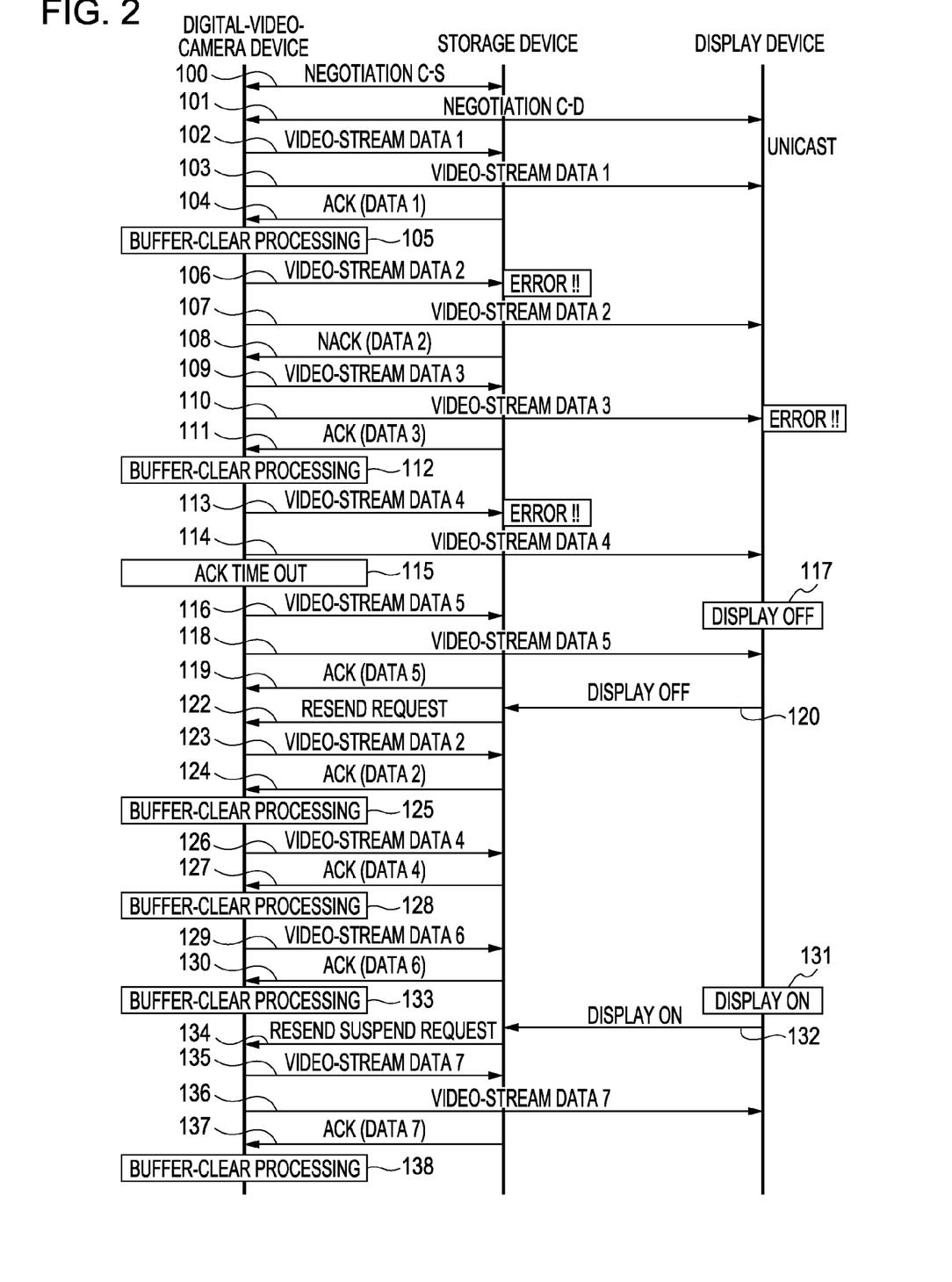
FIG. 2 shows sequences relating to unicast communications according to an embodiment.

FIG. 2 shows sequences relating to unicast communications according to an embodiment. As shown in FIG. 2, each of the digital-video-camera device 1, the display device 2, and the storage device 3 performs an arbitration phase, at steps 100 and 101, before the video-stream data is transferred. The arbitration phases are performed, at steps 100 and 101, so as to inform each of the digital-video-camera device 1, the display device 2, and the storage device 3 of the configuration of the video-stream network centered on the digital-video-camera device 1 functioning, as the source of the video-stream data, and set the configuration data to each of the digital-video-camera device 1, the display device 2, and the storage device 3.

Figure 3:
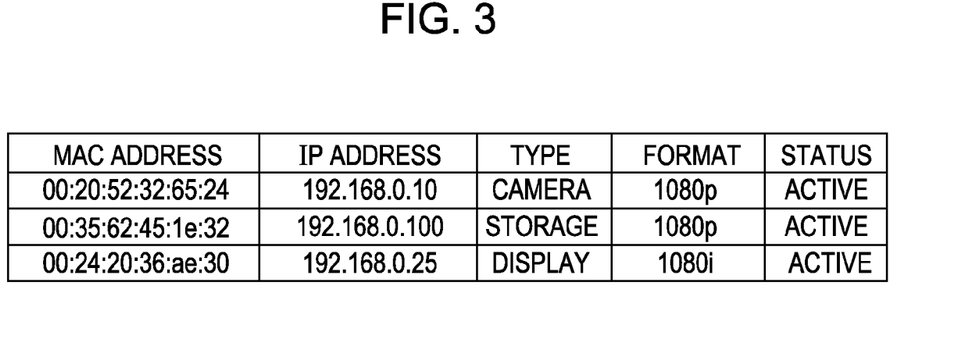
FIG. 3 is a diagram showing a first example table.

After the arbitration phases are finished, at steps 100 and 101, information, for example, as shown on a table of FIG. 3 is stored in each of the digital-video-camera device 1, the display device 2, and the storage device 3. FIG. 3 is a diagram showing a first example table.

One of the above-described arbitration phases is performed between the digital-video-camera device 1 and the display device 2, at step 101, and the other is performed between the digital-video-camera device 1 and the storage device 3, at step 100, by performing the unicast communications.

After the above-described arbitration phases are finished, the digital-video-camera device 1 starts encoding the video-stream data.

The video-stream data encoded by an encoder 6 is read by the CPU 4 of the digital-video camera device 1, packetized according to a communication system under which the video-stream data is externally transmitted, and transferred to the local storage 8. After that, the CPU 4 of the digital-video camera device 1 reads the communication packet stored in the local storage 8, as required, and transmits the read communication packet to the communication unit 7. Upon receiving the communication packet (video-stream data 1), the communication unit 7 starts transferring the video-stream data 1 via the network, at steps 102 and 103.

Upon receiving the video-stream data 1, at step 102, the CPU 15 of the storage device 3 performs cyclic-redundancy checking (CRC) or the like for the video-stream data 1 transmitted to the communication unit 16, at step 102, so as to verify the authenticity of the video-stream data 1. The CPU 15 of the storage device 3 determines whether or not the video-stream data 1 is received correctly on the basis of the verification result.

If it is determined that the video-stream data 1 is correctly received by the storage device 3, the CPU 15 of the storage device 3 transmits an acknowledgment (ACK) signal to the digital-video-camera device 1, at step 104. Further, the CPU 15 of the storage device 3 changes the form of the correctly received video-stream data 1 from the communication-packet form to the video-stream form, and stores the video stream in the storage 17, as required.

On the other hand, upon receiving the video-stream data 1, at step 103, the CPU 10 of the display device 2 changes the form of the received video-stream data 1 from the communication-packet form to the video-stream form without verifying the authenticity of the video-stream data 1 transmitted to the communication unit 13, at step 103. Otherwise, the CPU 10 of the display device 2 verifies the authenticity of the video-stream data 1 transmitted to the communication unit 13, at step 103, performs nothing even though a packet error occurs, and changes the form of the received data from the communication-packet form to the video-stream form. Here, the authenticity verification or the like may be performed by the communication unit 13 or the like instead of the CPU 10 of the display device 2. Hereinafter, however, it is determined that the authenticity verification is performed by the CPU 10 for the sake of simplicity.

The decoder 12 of the display device 2 processes the video-stream data 1 transmitted from the CPU 10 into video and shows the video on the display unit 11.

While the arbitration phases are performed, at steps 100 and 101, the CPU 4 of the digital-video-camera device 1 transmitting the video-stream data identifies media-access-control (MAC) address 00: 35: 62: 45: 1e: 32, as the address of the storage device 3. Therefore, the CPU 4 waits for an ACK signal transmitted from the storage device 3, where information about the MAC address (or an Internet Protocol (IP) address) is added to the ACK signal. Upon receiving the ACK signal, at step 104, the CPU 4 deletes a work area of the video-stream data 1 from the local storage 8, at step 105.

After that, the CPU 4 of the digital-video-camera device 1 transfers video-stream data in sequence. When a CRC error or the like is detected from video-stream data 2 transmitted to the CPU 15 of the storage device 3, at steps 106 and 107, the storage device 3 transmits a negative-acknowledgement (NACK) signal to the digital-video-camera device 1, at step 108, where information about the MAC address of the storage device 3 is added to the NACK signal, so as to inform the digital-video-camera device 1 of the detected CRC error. Upon receiving the NACK signal, at step 108, the CPU 4 of the digital-video-camera device 1 does not delete data on the work area corresponding to the video-stream data 2 stored in the local storage 8, and stores the work-area data, as it is. When mounting the local storage 8 by using a silicon disk including a flash memory or the like, the work-area data can be generated and/or deleted by using a file-management system or the like of an operating system (OS) installed onto the digital-video-camera device 1. The above-described configuration will be described later in detail.

As shown in FIG. 2, a reception error occurs in the display device 2 when the video-stream data 3 is transmitted, at steps 109 and 110. However, the CPU 10 of the display device 2 does not perform the authenticity verification, changes the form of the reception data from the communication-packet form to the video-stream form, and transmits the video stream to the decoder 12 unconditionally. Therefore, a noise occurs in video shown on the display 11.

On the other hand, since the video-stream data 3 is successfully transmitted to the CPU 15 of the storage device 3, the CPU 15 transmits an ACK signal to the CPU 4 of the digital-video-camera device 1, at step 111, where information about the MAC address of the storage device 3 is added to the ACK signal, so as to inform the CPU 4 that the video-stream data 3 is successfully transmitted to the CPU 15. Upon receiving the ACK signal, at step 111, the CPU 4 deletes data on a work area of the video-stream data 3 from the local storage 8, at step 112.

Further, when video-stream data 4 is transmitted, at steps 113 and 114, the CPU 15 of the storage device 3 has difficulty in recognizing that communications were performed, for example. In such cases, it is difficult for the CPU 15 to transmit the ACK signal and/or the NACK signal to the CPU 4. Therefore, if the ACK signal and/or the NACK signal is not transmitted to the CPU 4 of the digital-video-camera device 1 by a predetermined timeout 115 after the video-stream data 4 is transmitted, the CPU 4 of the video-camera device 1 determines that the communications ended in failure. Subsequently, the digital-video-camera device 1 does not delete data on the work area corresponding to the video-stream data 4 stored in the local storage 8 and stores the work-area data in its original form, as is the case where the NACK signal is received. After that, the video-stream data 5 is transmitted to the display device 2 at step 118. Since the video-stream data 5 is successfully transmitted to the storage device 3 at step 116, the CPU 15 transmits an ACK signal to the CPU 4 of the digital-video-camera device 1 at step 119, so as to inform the CPU 4 that the video-stream data 5 is successfully transmitted to the CPU 15. Upon receiving the ACK signal, the CPU 4 deletes data on a work area of the video-stream data 5 from the local storage 8, at step 121.

The above-described processing is performed when an error occurs in communications performed between the digital-video-camera device 1 and the storage device 3. Hereinafter, processing performed when the display 11 is determined to be in an off state (e.g., turned off), at step 117, will be described. In an embodiment, the display unit 11 is determined to be in an off state (e.g., turned off), at step 117, if the video corresponding to video-stream data 5, which is received the display device 2 (at step 118) and the storage device 3 (at step 116), is not being viewed by any person, as described below.

1: The power of the display unit is turned off (However, the main power is not turned off.).

2: The video that is shown on the display unit and that corresponds to video-stream data transferred from the digital-video-camera device 1 is switched to different video and shown no more.

3: The video that is currently shown on the display unit and that corresponds to the video-stream data transferred from the digital-video-camera device 1 is caused to pause.

4: It is determined that there is no person viewing the video shown on the display unit (by using an infrared sensor or the like).

When the display unit is determined to be in an off state (e.g., turned off), at step 117, the CPU 10 of the display device 2 transmits a packet to the storage device 3, so as to inform the storage device 3 of the message "Display Off", at step 120. Upon receiving the packet, at step 120, the CPU 15 of the storage device 3 transmits a Resend-Request-notification packet to the digital-video-camera device 1, at step 122.

Upon receiving the Resend-Request-notification packet, at step 122, the CPU 4 of the digital-video-camera device 1 reads error packets (video-stream data) that had been generated and accumulated on the local storage 8 by then in sequence. Then, the CPU 4 of the video-camera device 1 resends the error packets (video-stream data) from the communication unit 7 to the storage device 3, at steps 123 and 126. The CPU 4 deletes the error packets that had been resent with success from the local storage, as required, at steps 125 and 128.

After the accumulated error packets are resent, at steps 123 to 128, the CPU 4 of the digital-video-camera device 1 subsequently transfers video-stream data 6, at step 129. The CPU 4 deletes the error packets that had been sent with success from the local storage at steps 130, 133. However, the CPU 4 resends the error packets every time a transfer error occurs over the time period where the display unit 11 is in the off state.

When the display unit 11 of the display device 2 is in the on state, at step 131, the CPU 10 of the display device 2 transmits a Display-On-notification packet to the storage device 3, at step 132. Upon receiving the Display-On-notification packet, at step 132, the CPU 15 of the storage device 3 transmits a Resend-Suspend-Request-notification packet to the digital-video-camera device 1, at step 134.

Upon receiving the Resend-Suspend-Request-notification packet, at step 134, the CPU 4 of the digital-video-camera device 1 assigns the display device 2, as a transfer destination of video-stream data 5 transmitted from then on, at steps 135, 136. At the same time, the CPU 4 of the digital-video-camera device 1 stops resending data to the storage device 3, the resend processing being performed every time a transfer error occurs, and restarts accumulating error packets onto the local storage 8. The CPU 4 deletes the error packets that had been sent with success from the local storage at steps 137, 138.

Accordingly, it becomes possible to show the video corresponding to data transferred from the digital-video-camera device 1 on the display device 2 with reduced display delays and store data streams in the storage device 2 with stability.

Hereinafter, two methods of managing the local storage 8 provided in the digital-video-camera device 1 will be described. According to one of the above-described methods, the CPU 4 or the like uses and stores information about the time where each of the packets is stored in the local storage 8, where the packets are obtained by encoding data and changing the form of the encoded data into the packet form, as a file name by using a file system of the OS in the above-described manner. An example file name used in the above-described embodiment is shown, as below.

File name (Date+Serial number) 221015_XXXXX etc.

The CPU 4 of the digital-video-camera device 1 generates the file for which the above-described file name is used for each packet and stores the file in the local storage 8 by using the file system of the OS, and deletes a file transferred with success. Eventually, only information about the names of files that were transferred without success remains. Therefore, the CPU 4 searches for a file name indicating an old date, so as to perform the resend processing. If a plurality of file names indicating the same date exists, the CPU 4 may give a high priority to a file with the smallest serial number and resend the file. Thus, the CPU 4 manages data for resending by using the above-described file system, which is effective in the case where video-stream data is transferred by using a variable-length packet.

Figure 4:
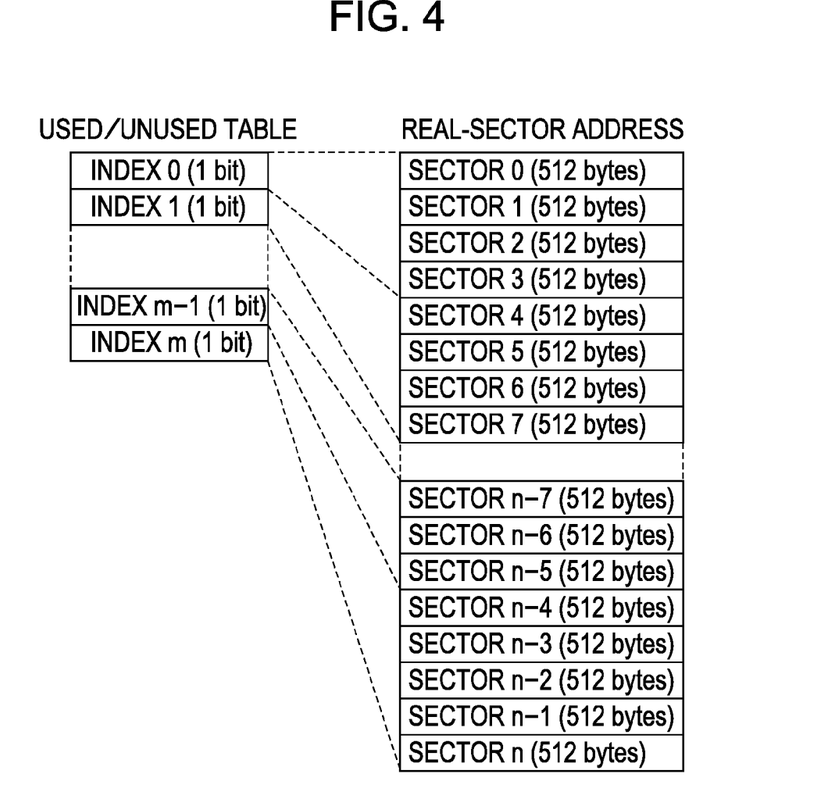
FIG. 4 shows an example local-storage-management table.

According to the other method, the CPU 4 of the digital-video-camera device 1 divides the local storage 8 in parts of which lengths are fixed, adds an index to each of the parts, and manages the status of each of the parts. FIG. 4 shows an example local-storage-management table. Here, the local-storage-management table is stored in a predetermined area of the local storage 8, or a memory or the like (not shown) of the digital-video-camera device 1.

As shown in FIG. 4, a premise is made that the actual local storage 8 is managed in units of 512 bytes. The maximum payload value obtained when a communication apparatus and/or device such as a local-area-wireless network is used is 1500 bytes. Therefore, four sectors are determined to be the single management unit corresponding to 1 byte shown on a used/unused table, so as to allow enough room for a header which will be added later. According to a local-storage-management table, that is, the used/unused table, the value of a used index is set to "1" and that of an unused index is cleared and set to "0".

Figure 5:
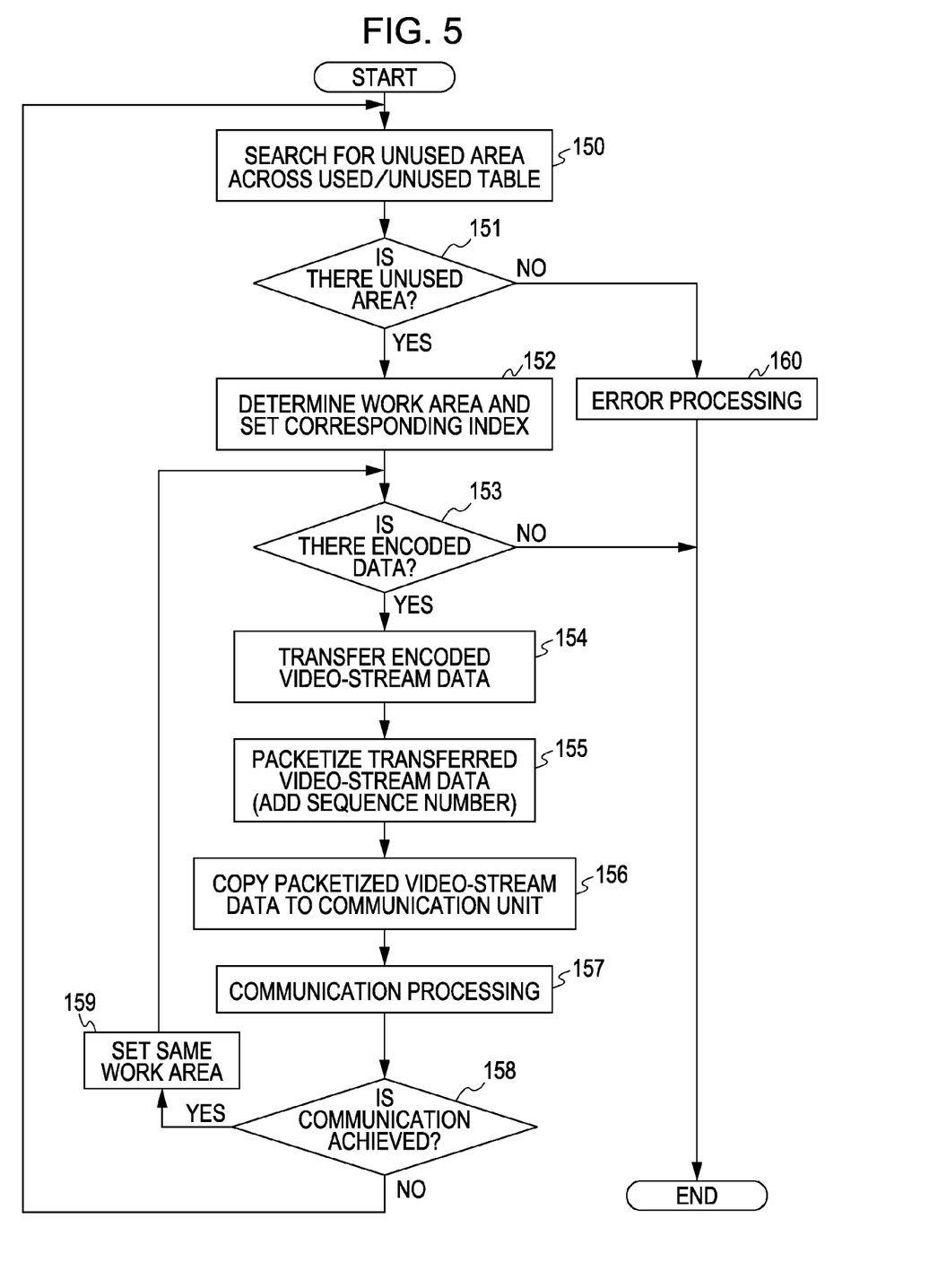
FIG. 5 is a flowchart showing example processing performed, so as to transfer video-stream data in real time.

FIG. 5 shows example processing performed by the CPU 4 of the digital-video-camera device 1, so as to transfer video-stream data in real time, when the above-described local-storage-management table is provided. FIG. 5 is a flowchart showing example processing performed, so as to transfer the video-stream data in real time.

The CPU 4 refers to the local-storage-management table, that is, the used/unused table shown in FIG. 4, when transferring the video-stream data encoded by the encoder 6 to the local storage 8, so as to change the form of the video-stream data into the packet form according to the communication system. That is to say, the CPU 4 searches for the index whose value is cleared and set to "0" across the local-storage-management table, at step 150.

Then, the CPU 4 determines whether or not there is an unused area on the basis of the detection result, at step 151. If it is determined that there is the unused area, that is to say, when the answer is yes, at step 151, the CPU 4 advances to step 152. If it is determined that there is no unused area, that is to say, when the answer is no, at step 151, the CPU 4 advances to step 160.

At step 152, the CPU 4 determines the available sector found, at step 151, to be a work area, and sets the index corresponding to the work area. On the other hand, at step 160, the CPU 4 performs error processing and terminates processing procedures shown in FIG. 5.

After the work area is determined, the CPU 4 determines whether or not encoded data exists in the encoder 6, at step 153. If it is determined that the encoded data exists in the encoder 6, that is to say, when the answer is yes, at step 153, the CPU 4 advances to step 154. If it is determined that no encoded data exists in the encoder 6, that is to say, when the answer is no, at step 153, the CPU 4 terminates the processing procedures shown in FIG. 5.

At step 154, the CPU 4 transfers the encoded data from the encoder 6 to a work memory. Subsequently, the CPU 4 generates a video-stream packet from the encoded data by using the work memory, at step 155. At that time, the CPU 4 adds a sequence number to part of the video-stream-data packet so that the storage device 3 can use sequence number later, so as to recover video-stream data.

Then, the CPU 4 copies the generated video-stream-data packet to the communication unit 7, at step 156. Since the video-stream-data packet is copied, at step 156, the video-stream-data packet generated and stored in the work memory is not deleted. The communication unit 7 performs communication processing for the video-stream-data packet transmitted thereto, at step 157, and notifies the CPU 4 of a result of the communication processing.

The CPU 4 determines whether or not the communication processing is achieved on the basis of the notification transmitted from the communication unit 7, at step 158. If it is determined that the communication processing is achieved, that is to say, when the answer is yes, at step 158, the CPU 4 advances to step 159. If it is determined that the communication processing is not achieved, that is to say, when the answer is no, at step 158, the CPU 4 returns to step 150, so as to search for another work area that can be used, so as to generate the next video-stream-data packet. At step 159, the CPU 4 makes settings, so as to generate the next video-stream-data packet by using the same work area.

By performing the above-described processing procedures repeatedly, the CPU 4 can leave only the work area storing the video-stream-data packet that had been transmitted without success, and keep transmitting the video-stream data without interruption.

Figure 6:
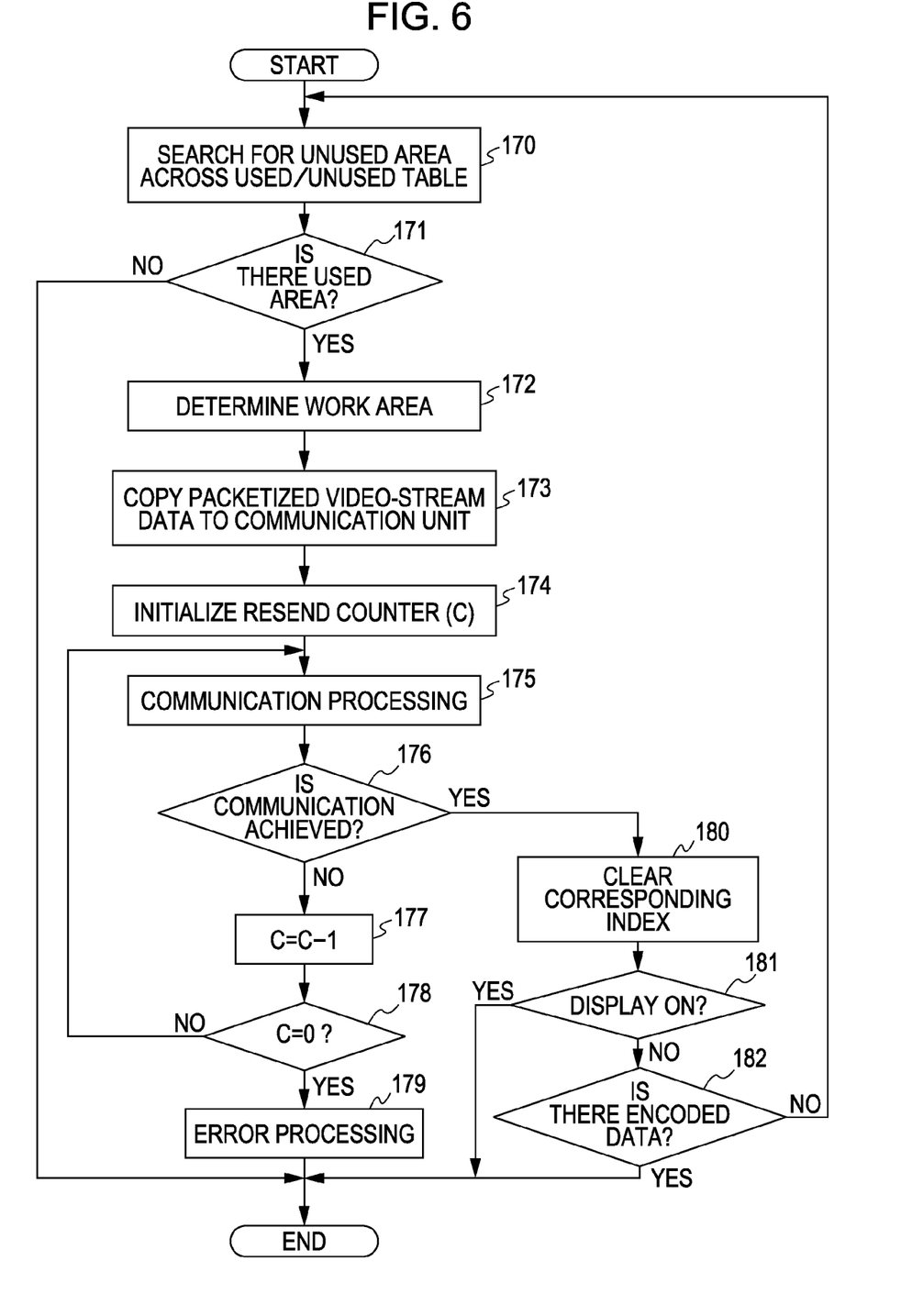
FIG. 6 is a flowchart showing example processing performed, so as to resend the video-stream data.

FIG. 6 shows example processing performed by the CPU 4 of the digital-video-camera device 1 when the display 11 is in the off state, so as to resend the video-stream data to the storage device 3. Namely, FIG. 6 is a flowchart showing example processing performed, so as to resend the video-stream data.

The CPU 4 refers to the local-storage-management table, that is, the used/unused table shown in FIG. 4. That is to say, the CPU 4 searches for an index whose value is set to "1" across the local-storage-management table, at step 170.

Then, if it is determined that a used area exists on the basis of the detection result, that is to say, when the answer is yes, at step 171, the CPU 4 advances to step 172. If it is determined that no used area exists, that is to say, when the answer is no, at step 171, the CPU 4 terminates the processing procedures shown in FIG. 6. The absence of the used area indicates that there is no video-stream-data packet for resending.

The CPU 4 determines the work area with an index whose value is set to "1" to be the next data area for resending, at step 172, and copies a video-stream-data packet stored in the work area to the communication unit 7, at step 173.

Here, the CPU 4, or the communication unit 7 initializes a resend counter C so that the resend counter C has an appropriate value, at step 174, so as to resend data with stability. The communication unit 7 performs resend processing for a video-stream-data packet transmitted thereto, at step 175, and notifies the CPU 4 of a result of the resend processing.

The CPU 4 determines whether or not the resend processing is achieved on the basis of the notification transmitted from the communication unit 7. If it is determined that the resend processing is achieved, that is to say, when the answer is yes, at step 176, the CPU 4 advances to step 180. If it is determined that the resend processing is not achieved, that is to say, when the answer is no, at step 176, the CPU 4 advances to step 177.

The CPU 4 clears and sets the value of the index corresponding to the work area to "0", at step 180. Then, the CPU 4 determines whether or not the display unit 11 remains in the off state, at step 181. The CPU 4 determines whether or not the display unit 11 remains in the off state according to whether or not the storage device 3 receives the Resend-Suspend-Request-notification packet, for example.

If it is determined that the display unit 11 remains in the off state, that is to say, when the answer is no, at step 181, the CPU 4 advances to step 182. If it is determined that the display unit 11 is in the on state, that is to say, when the answer is yes, at step 181, the CPU 4 terminates the resend processing shown in FIG. 6.

The CPU 4 determines whether or not encoded data exists in the encoder 6, at step 182. If it is determined that the encoded data exists in the encoder 6, that is to say, when the answer is yes, at step 182, the CPU 4 terminates the resend processing shown in FIG. 6, so as to give a higher priority to the encoded data than to other data and send the encoded data. If it is determined that no encoded data exists in the encoder 6, that is to say, if the answer is no, at step 182, the CPU 4 returns to step 170, so as to search for the next work area for resending.

On the other hand, the CPU 4 makes the resend counter C perform counting down, at step 177. Then, the CPU 4 determines whether or not the value of the resend counter C is zero, at step 178. If it is determined that the value of the resend counter C is zero, that is to say, if the answer is yes, at step 178, the CPU 4 advances to step 179. If it is determined that the value of the resend counter C is not zero, that is to say, if the answer is no at step 178, the CPU 4 returns to step 175.

The CPU 4 performs the resend processing repeatedly while making the resend counter C perform counting down. However, when the resend processing is not performed normally, the CPU 4 performs the error processing, at step 179, and terminates the processing procedures shown in FIG. 6.

By performing the above-described processing procedures repeatedly, the CPU 4 can read the video-stream-data packets that were transmitted without success from the work area in sequence when the display unit 11 is in the off state, and resend the video-stream-data packets.

Next, when an error occurs in video-stream data transmitted to the storage device 3, the video-stream data is stored in the storage 17, as described below. When an error occurs in currently transmitted video-stream data while the display device 2 shows a video stream, the digital-video-camera device 1 does not resend the video-stream data. Therefore, the video-stream data with a loss is stored in the storage device 3.

Compensation for the loss that occurs in the stored video-stream data is achieved by resending the video-stream-data packet corresponding to the above-described communication error while the display device 2 is stopped and/or suspended. In that case, the storage device 3, or the CPU 15 can compensate for the loss that occurs in the video-stream data with efficiency by using the sequence number added to the video-stream-data packet, at step 155.

However, when a communication link between the storage device 3 and the digital-video-camera device 1 is broken for any reason, it becomes difficult to compensate for the loss that occurs in the video-stream data. In that case, the video-stream data with the loss is stored in the storage device 3, which may cause problems. For example, it becomes difficult to correctly reproduce the video corresponding to video-stream data transmitted after the loss occurrence.

For reducing the above-described problem, the CPU 15 cuts the video at the front end and rear end of the part where the communication error occurred, and stores data on the cut video parts in the storage 17. After receiving the entire data, the CPU 15 reunites the entire video-stream data so that a single video stream is generated.

Figure 7:
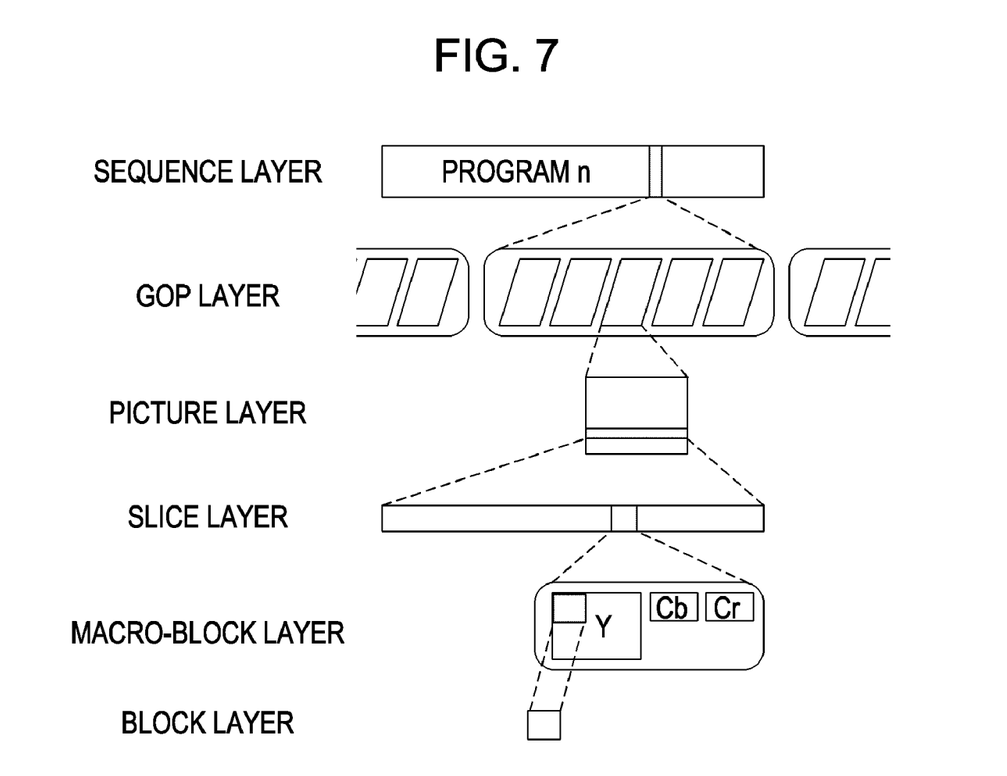
FIG. 7 shows an example configuration of video-stream data transmitted and/or received under Motion-Picture-Experts-Group (MPEG)-2 system, which is a typical video-stream system.

FIG. 7 shows an example configuration of a video stream transmitted under the MPEG-2 system, which is a typical video-stream system. Usually, a single video stream is equivalent to a single program, that is, a single unit of a sequence layer, as shown in FIG. 7. The single program can be divided into a plurality of group-of-picture (GOP) units. Usually, a video stream transmitted under the MPEG-2 system is divided into the GOP units. Other than that, a picture layer provided in frames and/or fields, a slice layer including a plurality of lines provided, as a conversion unit, a macro-block layer including the least significant blocks provided, as the conversion unit, and a block layer including discrete-cosine-transform (DCT)—conversion units are provided in sequence.

Figure 8:
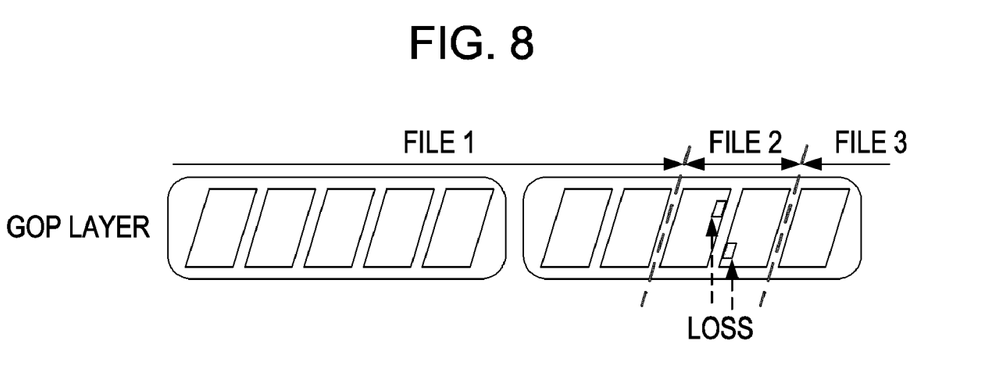
FIG. 8 shows an example configuration of a group-of-picture (GOP) layer of video-stream data stored in a storage unit, where losses occur in the video-stream data.

FIG. 8 shows an example configuration of a GOP layer provided when video-stream data with losses is stored in the storage 17. When communication errors are caused and distributed, as shown in FIG. 8, the CPU 15 of the storage device 3 stores the video-stream data up to the GOP unit immediately before the part where the losses occur in the storage 17, as File 1. Further, the CPU 15 stores the GOP unit, or a plurality of the GOP units where the communication errors occur in the storage 17, as File 2, and stores the GOP units following the GOP unit(s) where the losses occur into the storage 17, as File 3.

After that, the CPU 15 of the storage device 3 resends the video-stream data, so as to compensate for the File 2 including the losses. After the compensation is finished, the CPU 15 connects the Files 1, 2, and 3 to one another and makes them into data on a single video stream, and stores the video-stream data in the storage 17 again.

By performing the above-described processing procedures, it becomes possible to store video-stream data including no error in the storage 17 with stability, even though the communication-error part is not compensated for any reason.

Second Embodiment

According to the first embodiment, the storage 17 operates at all times and stores data on an image picked up by the digital-video-camera device 1, and the display unit 11 is often suspended over a predetermined time period due to switching or the like, as in the case where a monitoring camera is used, for example. According to a second embodiment of the present invention, video-stream data is transmitted from a camera device to each of a display device and a storage device through multicast communications, as in the case where the camera device is installed in an entrance or the like.

Figure 9:
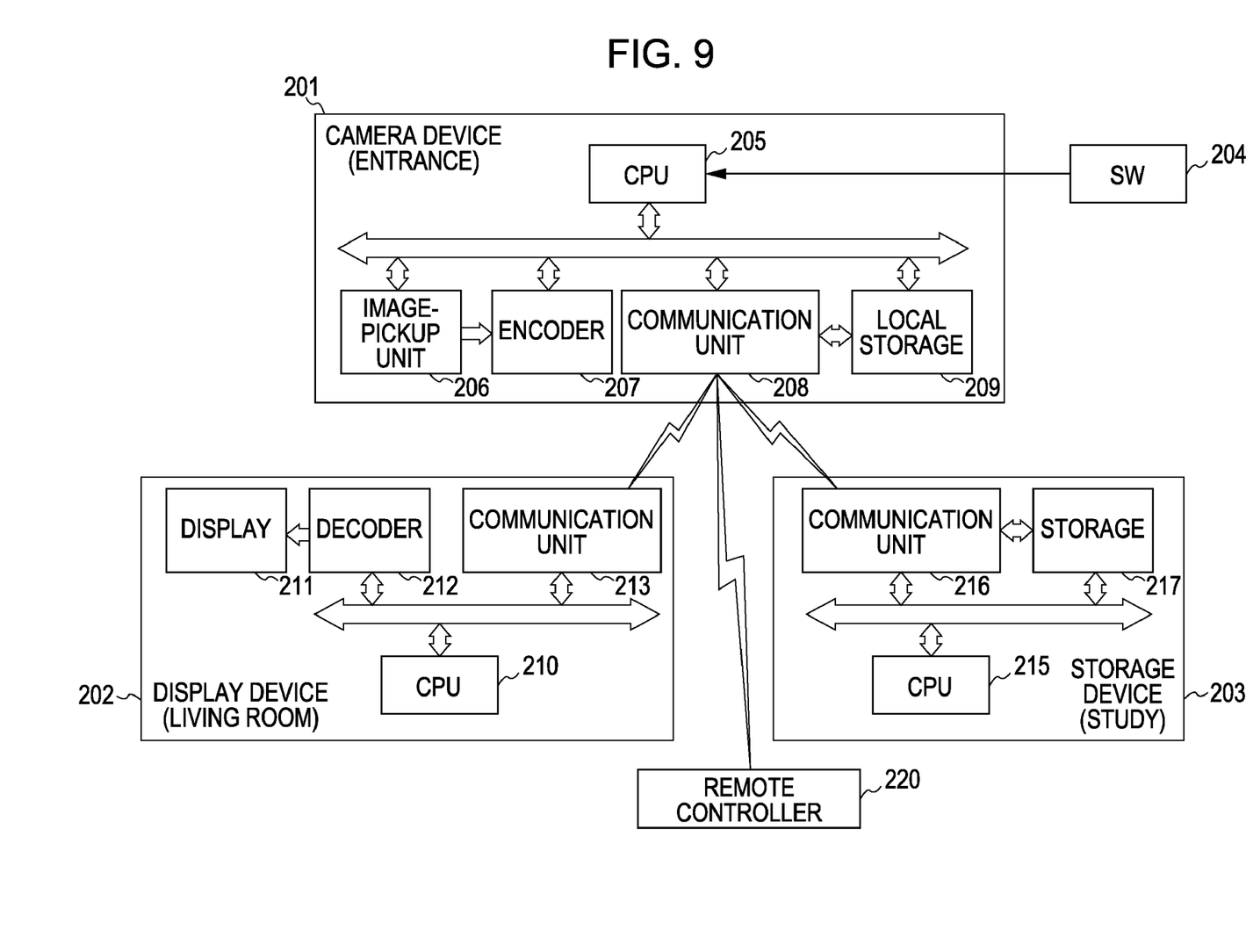
FIG. 9 shows the hardware configuration of example devices included in a system according to another embodiment of the present invention.

FIG. 9 shows the hardware configuration of each of example devices included in a system according to the second embodiment. A camera device 201 is configured to externally transmit data on a picked up video stream to a network and installed in the entrance or the like. Display device 202 is configured to decode the video-stream data transmitted to the network and show the video stream, and installed in a living room or the like. A storage device 203 is configured to accumulate and store the video-stream data externally transmitted to the network, and installed in a study or the like.

A ringing switch 204 is installed on an entrance door or the like. A CPU 205 controls the camera device 201. The CPU 205 executes a program stored in a local-storage unit 209 or the like, for example, so as to offer functions of the camera device 201 that will be described later and/or perform processing procedures shown in a flowchart or the like that will be described later.

An image-pickup unit 206 acquires and transmits data on an image to the camera device 1. An encoder 207 encodes data on images picked up by the image-pickup unit 206 into data on a video stream transmitted under the MPEG system and/or by the H.264 standard, for example. A communication unit 208 performs communication processing between the camera device 201 and external devices and/or apparatuses. A local-storage unit 209 is provided in the camera device 201, as local storage with a relatively low capacity, such as a flash memory.

A CPU 210 controls the display device 202. The CPU 210 executes a program stored in a memory or the like provided in the display device 202, so as to offer functions of the display device 202 that will be describe later.

A display unit 211 shows images and/or video for the display device 202. A decoder 212 decodes the video-stream data transmitted to the network into video information. A communication unit 213 is provided in the display device 202 and configured to perform communication processing.

A CPU 215 controls the storage device 203. The CPU 215 offers functions of the storage device 203 that will be described later by executing a program stored in a storage unit 217, for example.

A communication unit 216 is provided in the storage unit 203 and configured to perform communication processing.

The storage unit 217 is provided in the storage device 203, as a large-capacity storage including a hard disk drive (HDD), for example.

A remote controller 220 is configured to control the camera device 201 by wireless from a living room or the like where the display device 202 is installed.

Here, the digital-video-camera device 201 transmits video-stream data relating to picked up video to each of the display device 202 and the storage device 203 by performing multicast communications. Upon receiving the video-stream data, the display device 202 shows video on the display unit 11 in real time. Further, the storage device 3 accumulates the video-stream data on the storage 17.

Figure 10:
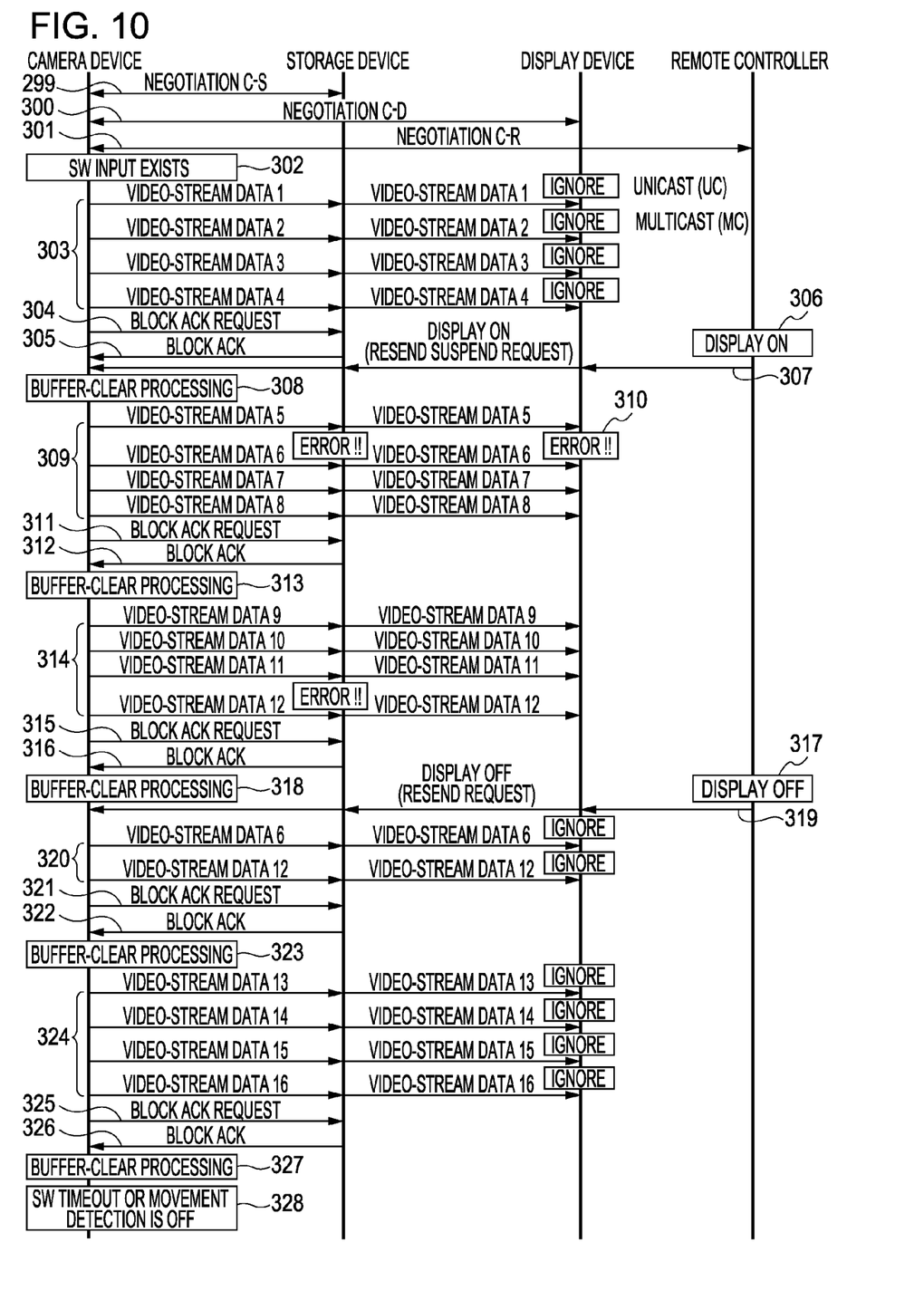
FIG. 10 shows sequences relating to multicast communications.

FIG. 10 shows sequences relating to the multicast communications. As shown in FIG. 10, each of the camera device 201, the display device 202, the storage device 203, and the remote controller 220 performs an arbitration phase, at steps 299, 300, and 301, respectively, before the video-stream data is transferred. Each of the arbitration phases is performed, at steps 299, 300, and 301, so as to notify each of the devices 201, 202, 203, and 220 of the configuration of a video-stream network centered on the camera device 201 functioning, as the source of the video-stream data, and set data on the video-stream-network configuration to each of the devices 201, 202, 203, and 220.

Figure 11:
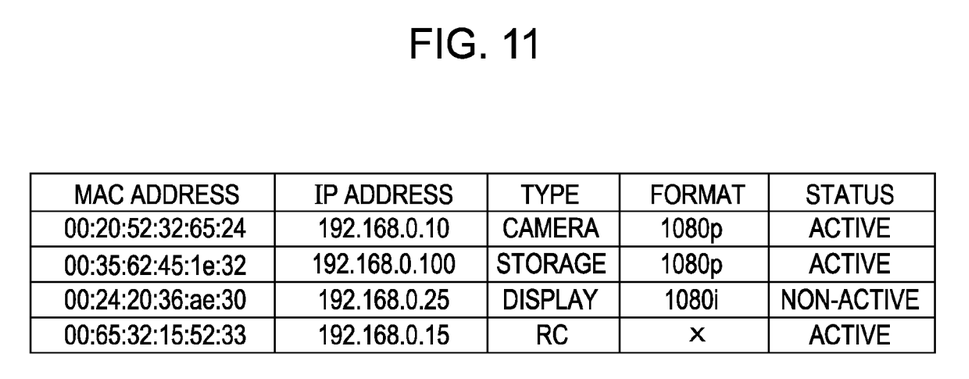
FIG. 11 is a diagram showing a second example table.

After the arbitration phases performed, at steps 299, 300, and 301 are finished, data on a table shown in FIG. 11, for example, is stored in each of the devices 201, 202, 203, and 220. Namely, FIG. 11 is a diagram showing a second example table.

Here, the arbitration phase is performed between the camera device 201 and the display device 202 through the unicast communications, at step 300. Further, the arbitration phase is performed between the camera device 201 and the storage device 203 through the unicast communications, at step 299. Further, the arbitration phase is performed between the camera device 201 and the remote controller 220 through the unicast communications, at step 301.

When the above-described arbitration phases are finished and the ringing switch 204 connected to the camera device 201 is pressed down, encoding of the video-stream data stored in the camera device 201 is started.

The video-stream data encoded by the encoder 207 is read by the CPU 205 and processed into a packet according to a communication system under which the video-stream data is externally transmitted, and transferred to the local-storage unit 209. After that, the CPU 205 reads the communication packet prepared in the local-storage unit 209, as required, and transmits the communication packet to the communication unit 208. Upon receiving the communication packet, that is, video-stream data 1, the communication unit 208 starts outputting the video-stream data 1 to the network, at step 303.

The transmission and/or reception of the video-stream data 1 is performed through the multicast communications so that only the storage device 203 should take measures against the data resending. Therefore, the CPU 205 performs block-transfer processing (Block ACK transfer) which allows for acquiring the ACK signals corresponding to a plurality of packets at once. Therefore, the camera device 201, or the CPU 205 transmits the video-stream data 2, the video-stream data 3, and the video-stream data 4 subsequently to the video-stream data 1 through the multicast communications, at step 303, without waiting for the ACK signals.

On the other hand, upon receiving the video-stream data 1, the video-stream data 2, the video-stream data 3, and the video-stream data 4, at step 303, the CPU 215 of the storage device 203 performs a calculation such as the CRC for each of the video-stream data 1, the video-stream data 2, the video-stream data 3, and the video-stream data 4 transmitted to the communication unit 216, at step 303, so as to verify the data authenticity. Then, the CPU 215 determines whether or not each of the video-stream data 1, the video-stream data 2, the video-stream data 3, and the video-stream data 4 is transmitted to the communication unit 216 correctly on the basis of the verification result.

Then, the CPU 215 stores information about the determination result indicating whether or not each of the video-stream data 1, the video-stream data 2, the video-stream data 3, and the video-stream data 4 is transmitted to the communication unit 216 in the storage unit 217 or the like. Further, the CPU 215 changes the form of the correctly transmitted video-stream data from the communication-packet form to the video-stream form, and stores the video stream in the storage unit 217, as required.

After that, the CPU 205 of the camera device 201 transmits a Block-ACK-request signal to the storage device 203 through the unicast communications, at step 304, so as to know the reception status of a group of the video-stream data that had been transmitted. Upon receiving the Block-ACK-request signal, at step 304, the CPU 215 of the storage device 203 generates a reply packet on the basis of the stored determination-result information indicating whether or not each of the video-stream data 1, the video-stream data 2, the video-stream data 3, and the video-stream data 4 is transmitted to the communication unit 216. Then, the CPU 215 transmits a Block-ACK packet to the camera device 201, at step 305.

Then, the camera device 201, or the CPU 205 analyzes the Block-ACK packet transmitted, at step 305, so that the camera device 201 can recognize the presence and/or absence of the video-stream data which was transmitted without success and the number thereof. Subsequently, the CPU 205 removes a plurality of the video stream data which was transmitted with success from the local-storage unit 209 in sequence, at step 308.

Here, the remote controller 220 is operated by a user or the like at step 306, so that a Display-On (Resend Suspend Request) packet is transmitted from the remote controller 220 to each of the devices 201, 202, and 203 through the multicast communications, at step 307. Upon receiving the Display-On packet, at step 307, the CPU 210 of the display device 202 starts the display device 211 and starts showing video. Upon receiving the Display-On packet, at step 307, the CPU 205 of the camera device 201 does not perform the resend processing sequentially even though communication errors occur while the video-stream data is transmitted and/or received between the camera device 201 and the storage device 203, and disables the resend processing until the display device 211 is turned off.

Then, the remainder of the video stream data, that is, video-stream data 5, video-stream data 6, video-stream data 7, and video-stream data 8 are transmitted through the multicast communications, at step 309. If it is determined that an error at step 310 occurs during the transmission of the video-stream data 6 during the above-described multicast communications on the basis of the Block-ACK packet at step 312 corresponding to Block ACK Request 311, the CPU 205 does not resend the video-stream data 6 because the resend processing is disabled, as described above. Then, the CPU 205 deletes only data stored in the local storage corresponding to the video-stream data 5, the video-stream data 7, and the video-stream data 8 that had been transmitted successfully, at step 313.

On the other hand, upon receiving the video-stream data 5, the video-stream data 6, the video-stream data 7, and the video-stream data 8, at step 309, the CPU 210 of the display device 202 does not verify the authenticity of the video-stream data 5, the video-stream data 6, the video-stream data 7, and the video-stream data 8 that are transmitted to the communication unit 213, at step 309. Then, the CPU 210 changes the form of the transmitted data from the communication-packet form to the video-stream form. Otherwise, the CPU 210 verifies the authenticity of each of the video-stream data 5, the video-stream data 6, the video-stream data 7, and the video-stream data 8 that are transmitted to the communication unit 213, at step 309, and changes the form of the above-described transmitted data from the communication-packet form to the video-stream form without doing anything even though a packet error occurs in the above-described transmitted video-stream data. Here, processing including the authenticity verification or the like may be performed by the communication unit 213 or the like instead of the CPU 210 of the display device 202. Hereinafter, however, the processing including the authenticity verification or the like is performed by the CPU 210 for the sake of simplicity.

The decoder 212 decodes the video-stream data 5, the video-stream data 6, the video-stream data 7, and the video-stream data 8 that are transmitted from the CPU 210 into video and shows the video on the display device 211.

After that, the CPU 205 transfers the video-stream data in sequence at steps 314-136, 318 until the remote controller 220 transmits a Display-Off (Resend Request corresponding to an operation of Display-Off at step 317) packet to the camera device 201, at step 319. As described above, video-stream-data packets that are transmitted without success during the video-data-stream transfer, the video-stream-data packets including the video-stream data 6 and video-stream data 12, are accumulated on the local-storage unit 209 of the camera device 201.

Here, the remote controller 220 transmits the Display-Off (Resend Request) packet to each of the devices 201, 202, and 203 through the multicast communications, at step 319. Upon receiving the Display-Off packet, at step 319, the CPU 210 of the display device 202 stops showing the video on the display device 211 and enters the suspend mode.

Further, upon receiving the Display-Off packet, at step 319, the CPU 205 of the camera device 201 resends the video-stream-data packet that was transmitted without success and accumulated on the local-storage unit 209, at step 320. The CPU 205 of the camera device 201 transmits a Block-ACK-request signal to the storage device 203 at step 321. Upon receiving the Block-ACK-request signal, the CPU 215 of the storage device 203 generates a reply packet on the basis of the stored determination-result information indicating whether or not each of the video-stream data 6, the video-stream data 12 is transmitted to the communication unit 216. Then, the CPU 215 transmits a Block-ACK packet to the camera device 201, at step 322. Subsequently, the CPU 205 removes a plurality of the video stream data which was transmitted with success from the local-storage unit 209 in sequence, at step 323. The camera device 201 starts transmitting the video-stream data, so as to store the video-stream data in the storage device 203, at the time where the ringing switch 204 is pressed down, at step 302. The transmission of the video-stream data is continued until any of the following conditions is satisfied.

1. The remote controller 220 transmits the Display-Off packet, at step 319.

2. A predetermined time (e.g one minute) elapses since the ringing switch 204 is pressed down.

3. No movement is detected from video picked up by the camera device 201.

When the storing of the video-stream data in the storage device 203 is stopped because the condition 1 is satisfied, the camera device 201 stops performing the sequence shown in FIG. 10 without performing the processing at steps 324-327 on down included in the sequence. Further, when the storing of the video-stream data in the storage device 203 is stopped because the condition 2 and/or the condition 3 is satisfied, the camera device 201 continues to perform the above-described processing until the predetermined time is out and/or the movement detection is off, at step 328, and stops performing the above-described processing.

Figure 12:
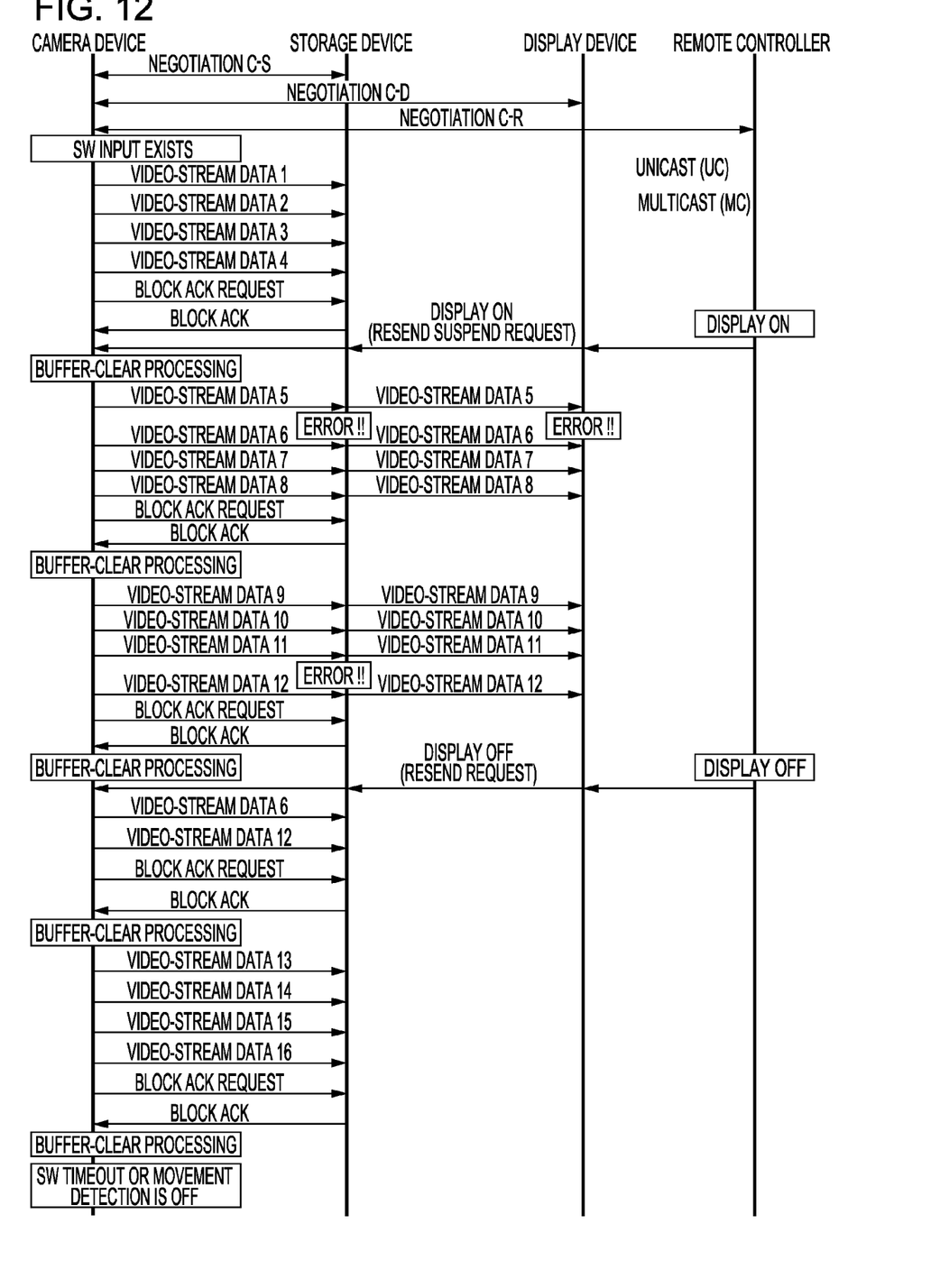
FIG. 12 shows sequences performed when the multicast communications and the unicast communications are performed in combination.

Further, the above-described system may perform the multicast communications and the unicast communications in combination, and perform the multicast communications alone when the display device 202 is active. FIG. 12 shows sequences performed in the above-described case. Namely, FIG. 12 shows sequences performed when the multicast communications and the unicast communications are performed in combination.

The difference between the sequences shown in FIG. 12 and those shown in FIG. 10 is that the multicast communications are performed only when the display device 202 is active and the unicast communications are performed when the display device 202 is suspended.

Thus, each of the above-described embodiments of the present invention allows for distributing stream data with low delay and storing the stream data with stability.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-128477 filed on May 2, 2006, which is hereby incorporated by reference herein in its entirety.

What is claimed is:

1. An apparatus comprising:
   a communication unit configured to transfer video-stream data to at least one of a storage device and a display device, wherein the storage device is of a first address for storing video-stream data and the display device is of a second address for displaying video corresponding to the video-stream data;
   a memory configured to store the video-stream data transferred to the storage device; and
   a controller configured to resend the video-stream data which is transferred from the communication unit to the storage device without success and which is stored in the memory to the storage device when the communication unit transfers the video-stream data to the storage device and does not transfer the video-stream data to the display device,
   wherein the controller does not resend the video-stream data which is transferred from the communication unit to the storage device without success when the communication unit transfers the video-stream data to the storage device and the display device.

2. The apparatus according to claim 1, wherein the controller determines that the communication unit does not transfer the video-stream data to the display device, upon receiving a resend request transmitted from the storage device.

3. The apparatus according to claim 1, wherein the controller determines that the communication unit does not transfer the video-stream data to the display device, upon receiving a Display-Off packet.

4. The apparatus according to claim 1, wherein the controller deletes the video-stream data from the memory after the video-stream data have been successfully transferred from the communication unit to the storage device.

5. The apparatus according to claim 1, further comprising an image-pickup unit configured to pick up an image used as the video-stream data.

6. The apparatus according to claim 1, wherein the controller is configured to determine that the communication unit does not transfer the video-stream data to the display device, if any one of following states is detected: a first state where a power of the display device is turned off, a second state where the video corresponding to the transferred video-stream data is not displayed on the display device, a third state where the display of the video corresponding to the transferred video-stream data is suspended, and a fourth state where no one sees the video displayed on the display device.

7. The apparatus according to claim 1, wherein the controller resends the video-stream data which is transferred from the communication unit to the storage device without success and which is stored in the memory during which the communication unit transfers the video-stream data to the storage device and the display device, when the communication unit transfers the video-stream data to the storage device and does not transfer the video-stream data to the display device.

8. A method comprising:
transferring video-stream data to at least one of a storage device and a display device, wherein the storage device is of a first address for storing video-stream data and the display device is of a second address for displaying video corresponding to the video-stream data;
storing the video-stream data transferred to the storage device in a memory; and
resending the video-stream data which is transferred to the storage device without success and which is stored in the memory to the storage device when the video-stream data is transferred to the storage device and the video-stream data is not transferred to the display device,
wherein, in the resending step, the video-stream data which is transferred to the storage device without success and which is stored in the memory is not resent to the storage device, when the video-stream data is transferred to the storage device and the display device.

9. The method according to claim 8, wherein the video-stream data is not transferred to the display device upon receiving a resend request transmitted from the storage device.

10. The method according to claim 8, further comprising:
deleting the video-stream data from the memory after the video-stream data have been successfully transferred to the storage device.

11. The method according to claim 8, wherein the video-stream data is transferred from a video-camera device capable of generating video-stream data.

12. The method according to claim 8, wherein the video-stream data is not transferred to the display device if any one of following states is detected: a first state where a power of the display device is turned off, a second state where the video corresponding to the transferred video-stream data is not displayed on the display device, a third state where the display of the video corresponding to the transferred video-stream data is suspended, and a fourth state where no one sees the video displayed on the display device.

13. The method according to claim 8, wherein, in the resending step, the video-stream data, which is transferred to the storage device without success and which is stored in the memory during which the video-stream data is transferred to the storage device and the display device in the transferring step, is resent to the storage device, when the video-stream data is transferred to the storage device and the video-stream data is not transferred to the display device in the transferring step.

14. A computer-readable storage medium storing instructions which, when executed by an apparatus, causes the apparatus to perform operations comprising:
transferring video-stream data to at least one of a storage device and a display device, wherein the storage device is of a first address for storing video-stream data and the display device is of a second address for displaying video corresponding to the video-stream data;
storing the video-stream data transferred to the storage device in a memory; and
resending the video-stream data which is transferred to the storage device without success and which is stored in the memory to the storage device when the video-stream data is transferred to the storage device and the video-stream data is not transferred to the display device,
wherein, in the resending step, the video-stream data which is transferred to the storage device without success and which is stored in the memory is not resent to the storage device when the video-stream data is transferred to the storage device and the display device.

* * * * *